United States Patent
Fujiwara et al.

(10) Patent No.: US 8,381,798 B2
(45) Date of Patent: Feb. 26, 2013

(54) MICRO FLUID DEVICE HAVING PIPING TO CONTROL FLUID TEMPERATURE

(75) Inventors: Takayuki Fujiwara, Minami-Ashigara (JP); Mamoru Fujisawa, Minami-Ashigara (JP); Yoshiyuki Miyoshi, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 1234 days.

(21) Appl. No.: 12/058,621

(22) Filed: Mar. 28, 2008

(65) Prior Publication Data

US 2008/0236786 A1 Oct. 2, 2008

(30) Foreign Application Priority Data

Mar. 29, 2007 (JP) ................. 2007-089632

(51) Int. Cl.
*B60H 1/00* (2006.01)
*F28D 1/06* (2006.01)
*F28F 7/00* (2006.01)
*F28F 13/00* (2006.01)

(52) U.S. Cl. ............. 165/11.1; 165/72; 165/73; 165/74; 165/80.1; 165/135; 165/136

(58) Field of Classification Search .............. 165/72, 165/73, 74, 76, 80.1, 135, 136; 422/239, 422/569
See application file for complete search history.

(56) References Cited

U.S. PATENT DOCUMENTS

| | | | | |
|---|---|---|---|---|
| 3,735,588 A | * | 5/1973 | Moskowitz et al. | 165/135 |
| 3,901,269 A | * | 8/1975 | Henderson | 165/76 |
| 4,296,799 A | * | 10/1981 | Steele | 165/74 |
| 4,411,308 A | * | 10/1983 | Koerdt et al. | 165/70 |
| 4,678,104 A | * | 7/1987 | Pritchett | 165/136 |
| 4,735,259 A | * | 4/1988 | Vincent | 165/135 |
| 5,647,432 A | * | 7/1997 | Rexford et al. | 165/135 |
| 6,073,681 A | * | 6/2000 | Getchel et al. | 165/80.1 |
| 6,159,368 A | * | 12/2000 | Moring et al. | 422/239 |
| 6,338,802 B1 | * | 1/2002 | Bodner et al. | 422/569 |
| 6,675,880 B2 | * | 1/2004 | Namba et al. | 165/135 |
| 6,783,732 B2 | * | 8/2004 | Madden et al. | 422/569 |

(Continued)

FOREIGN PATENT DOCUMENTS

| | | |
|---|---|---|
| DE | 199 17 330 A1 | 10/2000 |
| DE | 10 2004 038 555 B3 | 8/2005 |

(Continued)

OTHER PUBLICATIONS

Notice of Reasons for Rejection, dated Dec. 24, 2010, issued in corresponding JP Application No. 2007-089632, 6 pages in English and Japanese.

(Continued)

*Primary Examiner* — Ljiljana Ciric

(74) *Attorney, Agent, or Firm* — Sughrue Mion, PLLC

(57) ABSTRACT

A micro fluid device includes a heating unit and a cooling unit, each with piping disposed within. The heating and cooling units are integrally coupled together, and fluid flows into the piping of respective units. A temperature control device includes a heat insulator which has a through hole equal in diameter to the piping disposed within the heating unit and cooling unit. The heat insulator is interposed between heating unit and the cooling unit. A positioning mechanism positions the heat insulator to bring the piping into communication with the through hole at the time of coupling the heating and cooling units.

15 Claims, 7 Drawing Sheets

U.S. PATENT DOCUMENTS

| | | |
|---|---|---|
| 7,549,788 B2 | 6/2009 | Fujiwara et al. |
| 2004/0213083 A1* | 10/2004 | Fujiwara et al. .............. 366/336 |
| 2006/0235170 A1 | 10/2006 | Iwasaki et al. |
| 2007/0231226 A1* | 10/2007 | Fujiwara et al. .............. 422/224 |
| 2008/0078446 A1* | 4/2008 | Fujiwara ....................... 422/100 |

FOREIGN PATENT DOCUMENTS

| | | |
|---|---|---|
| EP | 1 650 228 A1 | 4/2006 |
| JP | 2004-344877 A | 12/2004 |
| JP | 2006-061903 A | 3/2006 |
| JP | 2006-159165 A | 6/2006 |
| JP | 2006-187684 A | 7/2006 |
| JP | 2006-326542 A | 12/2006 |
| JP | 2007-029887 A | 2/2007 |
| WO | 00/62918 A2 | 10/2000 |
| WO | 00/62918 A3 | 10/2000 |
| WO | 03/022417 A2 | 3/2003 |
| WO | 2005/010055 A1 | 2/2005 |

OTHER PUBLICATIONS

Notification of Reasons for Rejection, dated Feb. 22, 2012, issued in corresponding JP Application No. 2007-89632, 15 pages in English and Japanese.

EP Communication, dated Aug. 6, 2009, issued in corresponding EP Application No. 08006048.6, 6 pages.

Hearing, dated Dec. 16, 2011, issued in corresponding JP Application No. 2007-089632, 5 pages in English and Japanese.

\* cited by examiner

MICRO FLUID DEVICE HAVING PIPING TO CONTROL FLUID TEMPERATURE

BACKGROUND OF THE INVENTION

1. Field of the Invention

The present invention relates to a micro fluid device, and in particular, to a micro fluid device with a function to accurately control change in temperature of fluid flowing through a fine channel.

2. Description of the Related Art

A micro fluid device with a fine channel has such a superior feature as to enable accurately controlling change in temperature of fluid flowing through a fine channel. And the micro fluid device is used as a device in a micro chemical process where various unit operations such as reaction, mixing, extraction and separation are performed. Unit operations by the micro fluid device require operations in which temperature of reactants is increased to a predetermined degree to accelerate reaction and then to quench to stop the reaction or solution into which solute high in temperature dissolves is quenched to accurately precipitate the solute. In particular, in the case where fine particles are produced by precipitation reaction in which solute is precipitated from solution into which the solute dissolves, it is extremely important to steeply quench the temperature of the solution.

The accurate control of temperature of fluid which flows through a fine channel requires a small heat transfer between the fine channel and the outside, an accurate change in temperature of fluid (enabling a rapid change in temperature) and a minimum possible dead space in the fine channel where the fluid may retain.

A micro fluid device provided with a mechanism for controlling temperature is described in, for example, Japanese Patent Application Laid-Open Nos. 2006-61903, 2006-159165 and 2006-326542. Japanese Patent Application Laid-Open Nos. 2006-61903 and 2006-159165 provide a device for covering the periphery of the fine channel with heat insulating materials. Japanese Patent Application Laid-Open No. 2006-326542 discloses a micro fluid device capable of precluding disturbance such as retention of fluid and temperature variation to improve quality of products.

The micro fluid devices in Japanese Patent Application Laid-Open Nos. 2006-61903 and 2006-159165 cover the periphery of the fine channel with heat insulating materials to enable reducing heat transfer between the fine channel and the outside, however, the micro fluid devices have a drawback in that they cannot rapidly stop reaction or perform precipitation reaction for producing fine particles because no device is provided to accurately change the temperature of the fluid.

Incidentally, the micro fluid device needs producing by fine processing because it has a fine channel. In this case, the micro fluid device can be more easily produced such that a plurality of units is formed by fine processing, thereafter the units are coupled together to be integrated. Japanese Patent Application Laid-Open No. 2006-326542 discloses an example in which various members forming the micro fluid device are coupled. Coupling portions are coupled with a plurality of tubes or connectors, causing a problem in that a dead space is liable to be formed at a connector portion and the temperature of fluid is liable to be scattered due to a subtle difference in length of the tubes.

SUMMARY OF THE INVENTION

The present invention has been made in view of the above situations and has for its object to provide a micro fluid device capable of accurately changing the temperature of fluid flowing through the fine channel and preventing the fluid from being retained at coupling portions even in structure in which a plurality of units is coupled.

To achieve the above object, a first aspect of the present invention provides a micro fluid device in which a plurality of units each with one piping therein is integrally coupled together to bring the cooling unit and heating unit piping into communication with each other to cause fluid to flow into the piping to perform desired unit operations, and at least one of the plurality of units is a temperature controlling unit for controlling the temperature of the fluid, comprising: a heat insulator which has a through hole equal in diameter to the heating unit piping and cooling unit piping and is interposed between the temperature controlling unit and an adjacent unit substantially adjacent to the temperature controlling unit; and a positioning mechanism which positions the heat insulator so as to bring the cooling unit piping and heating unit piping into communication with the through hole at the time of coupling the heating and cooling units.

Here, "substantially adjacent to" means that, in the case where a temperature detector (a temperature detecting plate), for example, which is not the primary unit of the micro fluid device is interposed between a temperature controlling unit and an adjacent unit, strictly speaking, the temperature controlling unit is not adjacent to the adjacent unit, however, this case is construed as being substantially adjacent.

According to the first aspect of the present invention, a heat insulator with a through hole which is brought into communication with piping formed in the temperature controlling unit and the adjacent unit and is equal in diameter to the adjacent unit piping is interposed between the temperature controlling unit which is at least one of a plurality of units and the adjacent unit substantially adjacent to the temperature controlling unit. This effectively insulates heat between the temperature controlling unit and the adjacent unit, so that the temperature of the fluid flowing from the temperature controlling unit to the adjacent unit through the through hole of the heat insulator can be rapidly changed from the temperature of the temperature controlling unit to that of the adjacent unit. That is to say, the temperature can be changed at a steep temperature gradient.

Incidentally, if two adjacent units different in temperature are thermally isolated from each other and fluid is caused to flow through the two units, the fine channel of one unit is generally coupled to that of the other unit by a coupling pipe or a connector made of SUS material, and so on, which is a thermal conductor. In this case, however, heat is conducted from the one unit to the other through the coupling pipe or the connector, so that a steep temperature gradient cannot be obtained, which fails to rapidly change the temperature of the fluid.

According to a second aspect, in the micro fluid device according to the first aspect of the present invention, the fine channel and the through hole are 5 mm or less in diameter.

The diameter of the fine channel and the through hole is preferably 5 mm or less at which the fluid flows as laminar flow, more preferably 1 mm or less, further preferably 500 μm or less to accurately control the temperature of the fluid flowing through the fine channel and the through hole. Incidentally, although a lower limit is not specified, a channel width which can be formed by a microfabrication becomes a lower limit.

According to a third aspect, in the micro fluid device according to the first or the second aspect of the present invention, the temperature controlling unit comprises two units of a heating unit and a cooling unit, and the heat insulator is substantially interposed between the heating unit and the cooling unit.

As described in the first aspect, the above phrase "substantially interposed" includes the case where a member such as the temperature detector which is not included in the units is interposed therebetween.

The third aspect describes a preferable embodiment of a relationship between the temperature controlling unit and the heat insulator. The heat insulator is preferably interposed between the heating unit and the cooling unit. This enables the fluid to be rapidly cooled or heated from the temperature of the heating unit to that of the cooling unit at a steep temperature gradient while the fluid is passing through the heat insulator.

According to a fourth aspect, in the micro fluid device according to any one of the first to the third aspects of the present invention, the heat conduction coefficient of the heat insulator is 2 (W/S/K) or less.

This is because the heat insulator with a heat conduction coefficient 2 (W/S/K) or less can be decreased in thickness. The reason is that, although the increase of thickness of the heat insulator can heighten an insulation effectiveness, the increase of thickness also lengthens the through hole, resulting in the retention of the fluid.

According to a fifth aspect, in the micro fluid device according to any one of the first to the fourth aspects of the present invention, the heat insulator is 0.5 mm or more to 50 mm or less in thickness.

There is a considerable relationship between the thickness of the heat insulator and the heat conduction coefficient, however, an excessively thick heat insulator involves a difficulty in workability of the fine channel, obliging the diameter of the channel to be increased, which results in the retention of the fluid. On the other hand, an excessively thin heat insulator does not provide a sufficient insulation effectiveness. Consequently, the heat insulator is preferably 0.5 mm or more to 50 mm or less in thickness.

According to a sixth aspect, in the micro fluid device according to any one of the first to the fifth aspects of the present invention, the positioning mechanism performs positioning by fitting a projecting mating part provided on the heat insulator into a recessed mating part provided in the temperature controlling unit, and the projecting mating part is formed to be a point symmetry with respect to the through hole.

According to the sixth aspect of the present invention, the positioning mechanism is formed such that the projecting mating part formed on the heat insulator is fitted into the recessed mating part formed in the temperature controlling unit, and the projecting mating part is formed to be a point symmetry with respect to the through hole. This forms the projecting mating part thermally symmetrical with regard to the through hole as a center, so that the position of the through hole of the heat insulator which is positioned with respect to the temperature controlling unit is not shifted even if the heat insulator thermally expands or shrinks.

According to a seventh aspect, in the micro fluid device according to any one of the first to the sixth aspects of the present invention, the through hole of the heat insulator is subjected to surface treatment to improve durability under and affinity for the fluid.

According to the seventh aspect, subjecting the inner surface of the through hole of the heat insulator to surface treatment to improve affinity for the fluid allows preventing bubbles in liquid from being retained in the fine channel when the liquid is caused to flow through the fine channel, for example. In addition, subjecting the inner surface of the through hole of the heat insulator to surface treatment to improve durability under the fluid allows maintaining smoothness on the fine channel to smooth the flow of the fluid, preventing the fluid from being retained. Incidentally, a surface treatment layer formed by the surface treatment to which the through hole is subjected is preferable superior in heat isolation. This is because the surface treatment layer is prevented from transferring heat between the temperature controlling unit and the adjacent unit.

According to an eighth aspect, in the micro fluid device according to any one of the first to the seventh aspects of the present invention, the heat insulator comprises a sealing member for preventing the fluid from leaking from the coupling portions between the channels and the through hole.

According to the eighth aspect, providing the sealing member on the heat insulator enables surely preventing the fluid from leaking even if the heat insulator thermally expands and shrinks.

According to a ninth aspect, the micro fluid device according to any one of the first to the eighth aspects of the present invention further comprises a temperature detector with a temperature detecting function which is interposed between the temperature controlling unit and the heat insulator, and has a communicating hole for bring the channel into communication with the through hole.

Providing the temperature detector between the temperature controlling unit and the heat insulator permits accurately detecting change in temperature while the fluid flows from the temperature controlling unit to the adjacent unit through the heat insulator.

According to the present invention, the micro fluid device is capable of accurately changing the temperature of fluid flowing through the fine channel and preventing the fluid from being retained at coupling portions even in structure in which a plurality of units is coupled.

DETAILED DESCRIPTION OF THE PREFERRED EMBODIMENTS

A preferable embodiment of a micro fluid device according to the present invention is described in detail with reference to the accompanied drawings.

Figure 1:
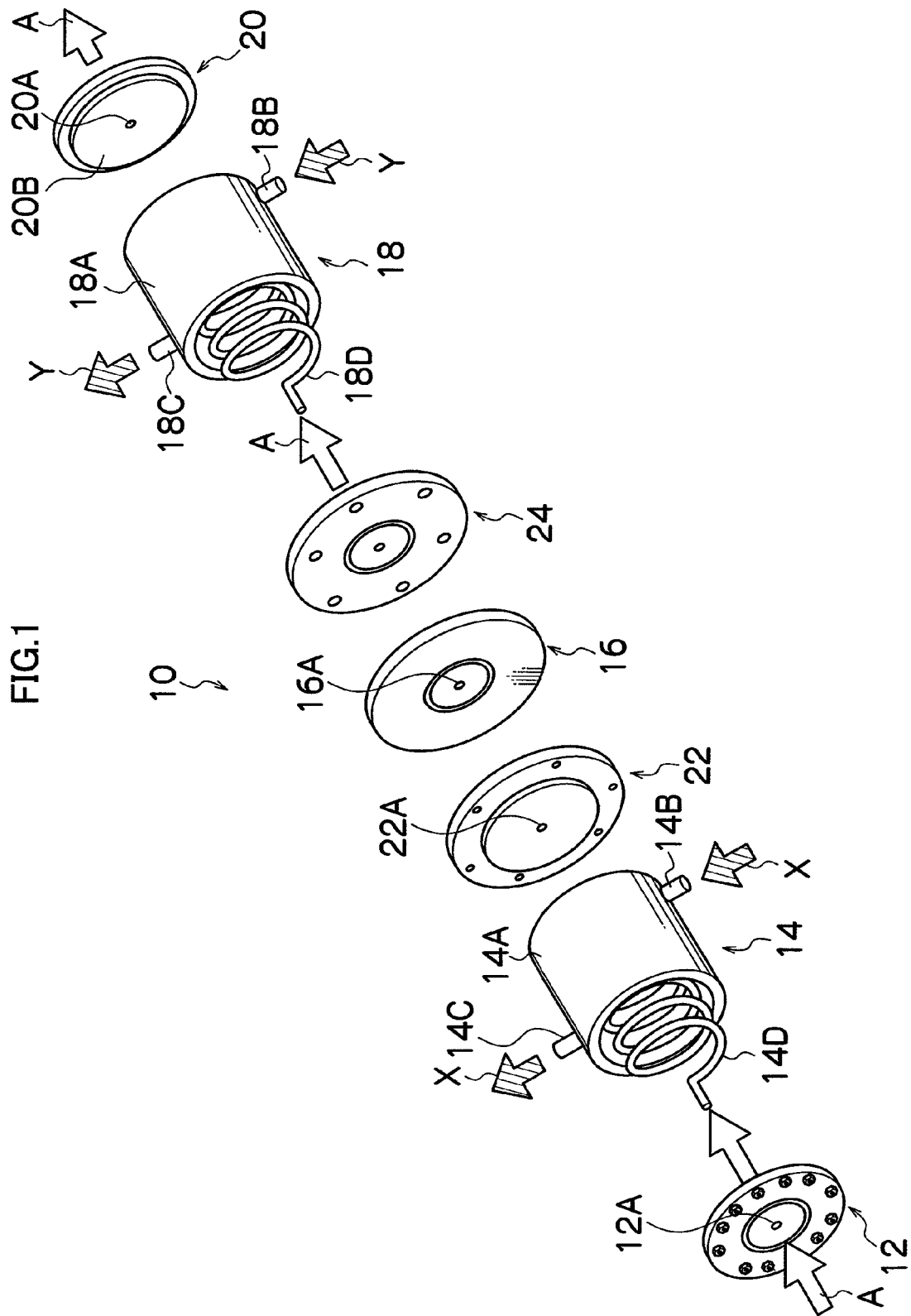
FIG. 1 is an exploded view illustrating the general configuration of the micro fluid device according to an embodiment of the present invention.
Figure 2:
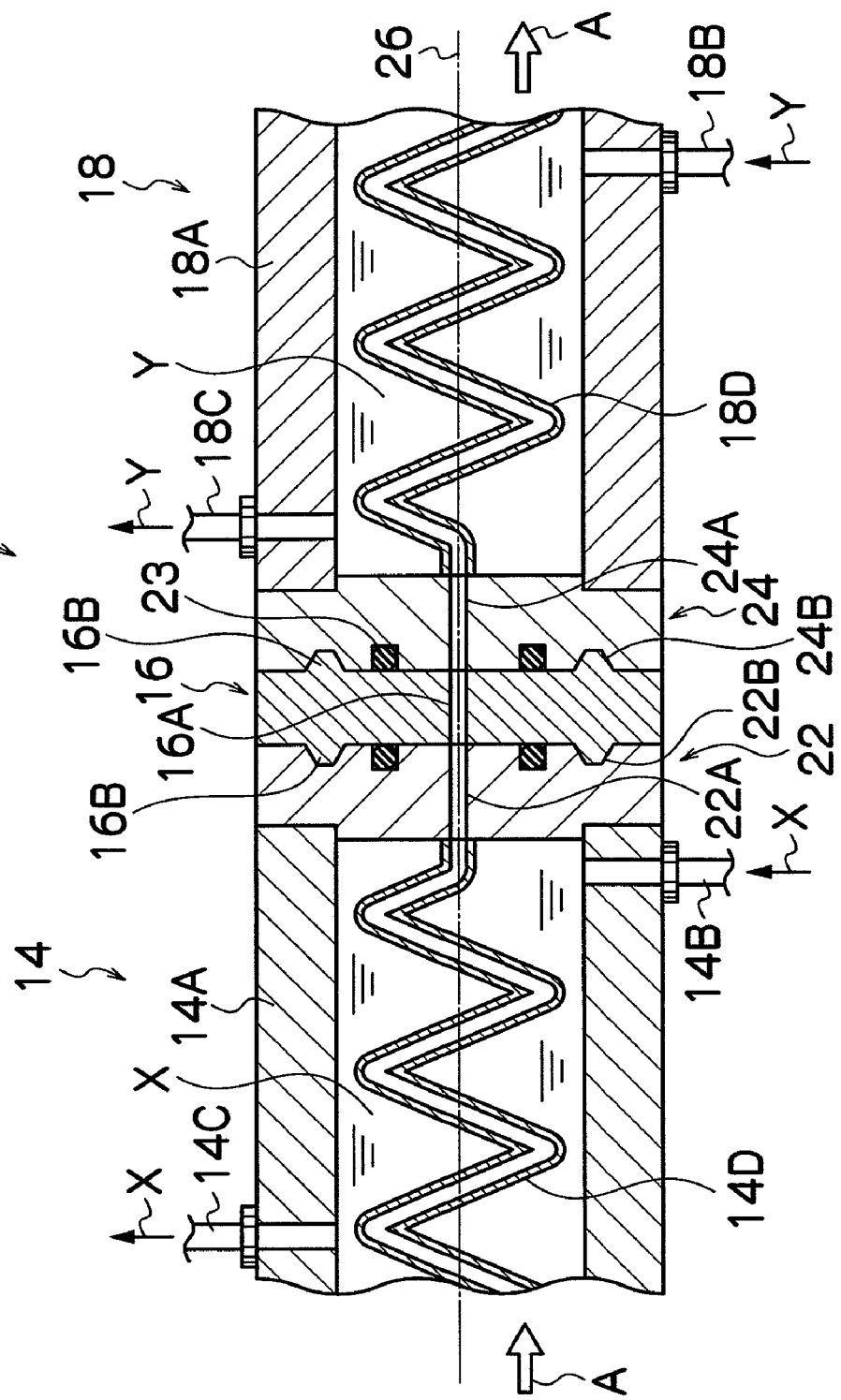
FIG. 2 is a cross section of the principal part in FIG. 1.

FIG. 1 is an exploded view illustrating one example of the general configuration of a micro fluid device 10 according to an embodiment of the present invention. FIG. 2 is a cross section of the principal part of the micro fluid device according to an embodiment of the present invention.

As illustrated in FIGS. 1 and 2, the micro fluid device 10 according to the embodiment of the present invention mainly includes a fluid supplying unit 12, a heating unit 14 (or, a temperature controlling unit), a heat insulator (heat insulating plate) 16, a cooling unit 18 (or, a temperature controlling unit) and a fluid discharging unit 20. Temperature detectors (temperature detecting plates) 22 and 24 are provided between the heating unit 14 and the heat insulator 16 and between the heat insulator 16 and the cooling unit 18 respectively. The units 12, 14, 18 and 20, the heat insulator 16 and the temperature detectors 22 and 24 are integrally assembled in the above order and fastened with a bolt, and so on (not shown), to form the micro fluid device 10.

As the fluid A supplied to the micro fluid device 10, there may used liquid or gas, which is selected according to target unit operations such as reaction, mixing, extraction and separation.

The fluid supplying unit 12 is formed in a disk shape and a through hole drilled at the center of the disk forms an inlet channel 12A (or, a fine channel) of the fluid A. A disk-shaped projection (refer to the projection 20B of the fluid discharging unit) is formed on the face of the fluid supplying unit 12 on the side of the heating unit, and the projection is fit into one end of a cylindrical casing 14A of the heating unit 14.

The heating unit 14 mainly includes the cylindrical casing 14A, a small-diameter pipe 14D through which the fluid A flows and a heating medium X for heating the fluid A. That is to say, the spiral pipe 14D is disposed in the casing 14A. The one end of the pipe 14D is connected to the inlet channel 12A of the fluid supplying unit 12. The other end of the pipe 14D is connected to a communicating hole 22A drilled at the center of the disk-shaped temperature detector 22. As the temperature detectors 22 and 24, there may be preferably used a thermo-couple detector, for example, however, a detector is not limited to the thermo-couple detector. An inlet 14B for the heating medium X is formed on the peripheral surface of the casing 14A on the side of one end thereof and an outlet 14C for the heating medium X is formed on the peripheral surface of the casing 14A on the side of the other end thereof. Although the spiral pipe is used in the present embodiment, a pipe is not limited to this, but the pipe may be linear or meandering. In short, it is important for the heating unit 14 to enable the fluid A to be effectively heated to a desired temperature.

The heat insulator 16 is formed in a disk shape and a through hole 16A is made at the center of the disk. As described later, a positioning mechanism provided on the heat insulator 16 performs positioning so that the shaft center of the through hole 16A coincides with that of the communicating hole 22A of the foregoing temperature detector 22. The heat conduction coefficient of the heat insulator 16 is preferably 2 (W/S/K) or less and more preferably 0.5 (W/S/K) or less. The heat insulator 16 is preferably 0.5 mm or more to 50 mm or less in thickness and more preferably 3 mm or more to 10 mm or less. As a material for the heat insulator 16, there may be preferably used resin materials such as, for example, polyimide resin, acrylic resin and Teflon (registered trademark) and ceramic material such as alumina and glass. In order to decrease the heat conduction coefficient of the heat insulator 16, the heat insulator 16 may be hollow, the air in the hollow may be evacuated therefrom to create a vacuum or the hollow may be filled with gas small in heat conduction coefficient. What is important is that the through hole 16A formed in the heat insulator 16 is thermally separated by the pipe 14D of the heating unit 14 and the pipe 18D of the cooling unit 18.

Figure 3:
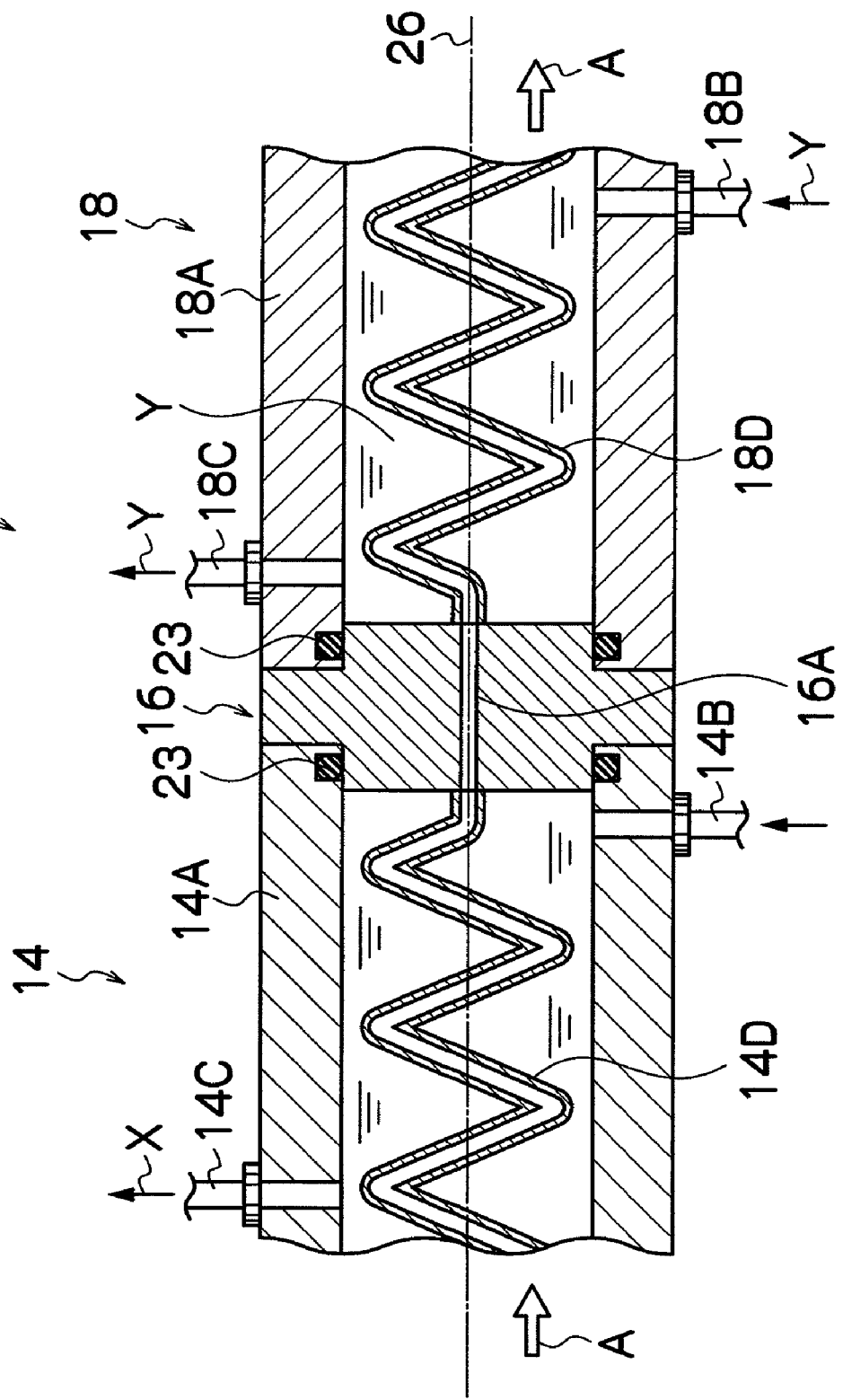
FIG. 3 is a cross section of the principal part excluding a temperature detector in FIG. 2.

The through hole 16A in the heat insulator 16 is preferably subjected to surface treatment to improve durability under or affinity for the fluid A. In this case, as described above, it is important for the heat insulator 16 to be thermally separated. It is desirable that a surface treatment layer itself is also small in heat transfer similarly to the heat insulator 16. As for the surface treatment, if the heat insulator 16 is made of resin, for example, the surface treatment layer small in heat transfer as in glass coating and ceramics coating is preferably formed. This is because the heat of the heating unit 14 and the cooling unit 18 is transferred to each other through the surface treatment layer in the case where the heat insulator 16 is directly interposed between the heating unit 14 and the cooling unit 18 without using the temperature detectors 22 and 24 as illustrated in FIG. 3, because the through hole 16A on which the surface treatment layer is formed is brought into contact with the pipes 14D and 18D made of, for example, "steel use stainless" (SUS) disposed in the heating unit 14 and the cooling unit 18. For this reason, if the through hole 16A is subjected to the surface treatment of SUS coating or Ti coating, it is preferable that the surface treatment layer is formed of a thin film which is resistive to heat transfer through the surface treatment layer or the surface treatment layer is prevented from touching the pipes 14D and 18D.

In addition, an O-ring 23 is interposed between the faces of the heat insulator 16 and the temperature detector 22 which are coupled together to seal against leakage of the fluid A from the coupling portion between the through hole 16A of the heat insulator 16 and the communicating hole 22A of the temperature detector 22.

The cooling unit 18 is the same in structure as the above heating unit 14. That is to say, the small-diameter spiral pipe 18D (fine channel) is disposed in the casing 18A. The one end of the pipe 18D is connected to the outlet channel 20A, described later, of the discharging unit 20. The other end of the pipe 18D is connected to a communicating hole 24A drilled at the center of the disk-shaped temperature detector 24. An inlet 18B for a cooling medium Y is formed on the peripheral surface of the casing 18A on the side of one end thereof and an outlet 18C for the cooling medium Y is formed on the peripheral surface of the casing 18A on the side of the other end thereof. The temperature detector 24 is the same as in the above description.

The fluid discharging unit 20 is formed in a disk shape and a through hole drilled at the center of the disk forms the inlet channel 12A (fine channel) for the fluid A. A disk-shaped projection 20B is formed on the face of the fluid discharging unit 20 on the side of the heating unit, and the projection 20B is fit into one end of the cylindrical casing 18A of the cooling unit 18.

The diameter of the inlet channel 12A of the fluid supplying unit 12, the pipe 14D of the heating unit 14, the communicating holes 22A and 24A of the first and the second temperature detectors 22 and 24, the through hole 16A of the heat insulator 16, the pipe 18D of the cooling unit 18 and the outlet channel 20D of the fluid discharging unit 20 is preferably 5 mm or less, more preferably 1 mm or less, particularly preferably 500 μm or less.

Figure 4:
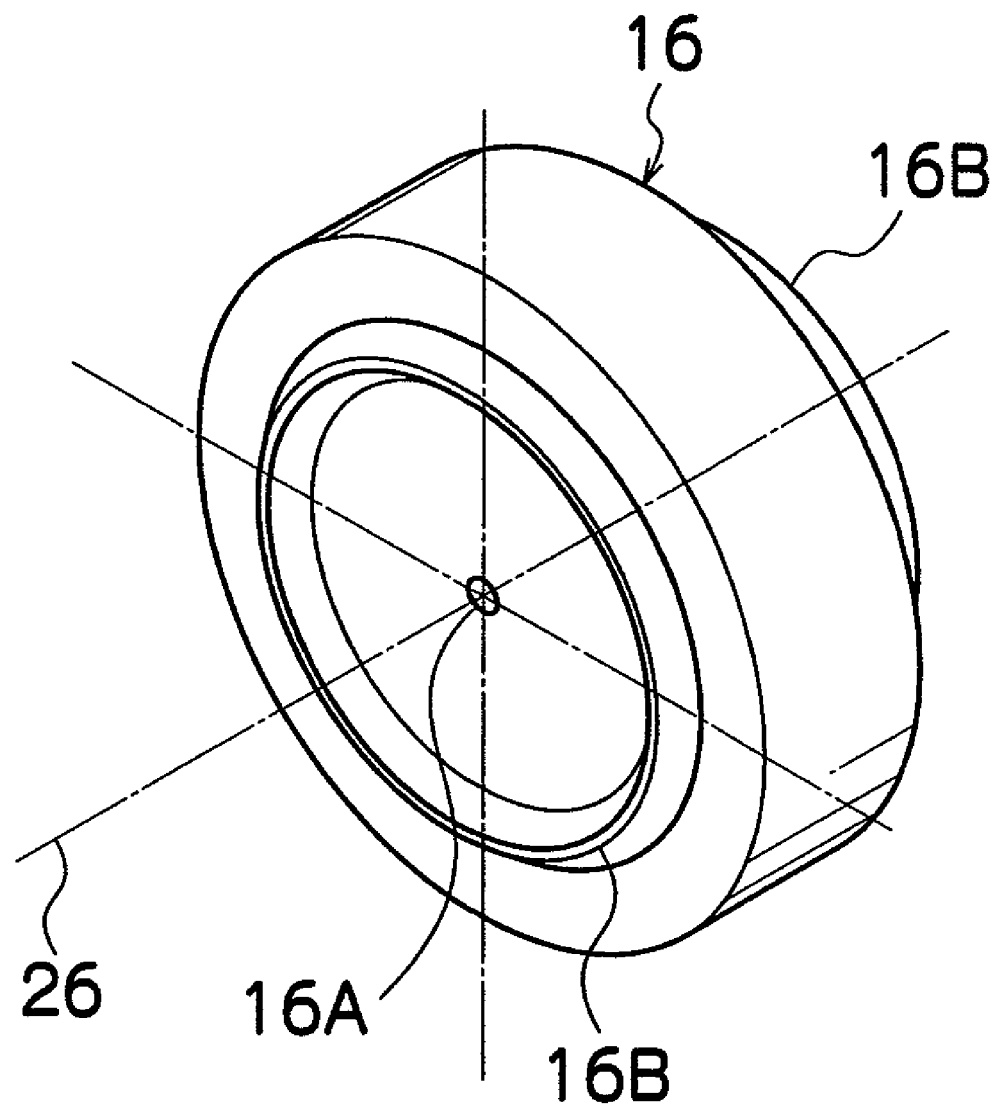
FIG. 4 is a perspective view illustrating one embodiment of a positioning mechanism of an heat insulator.
Figure 5:
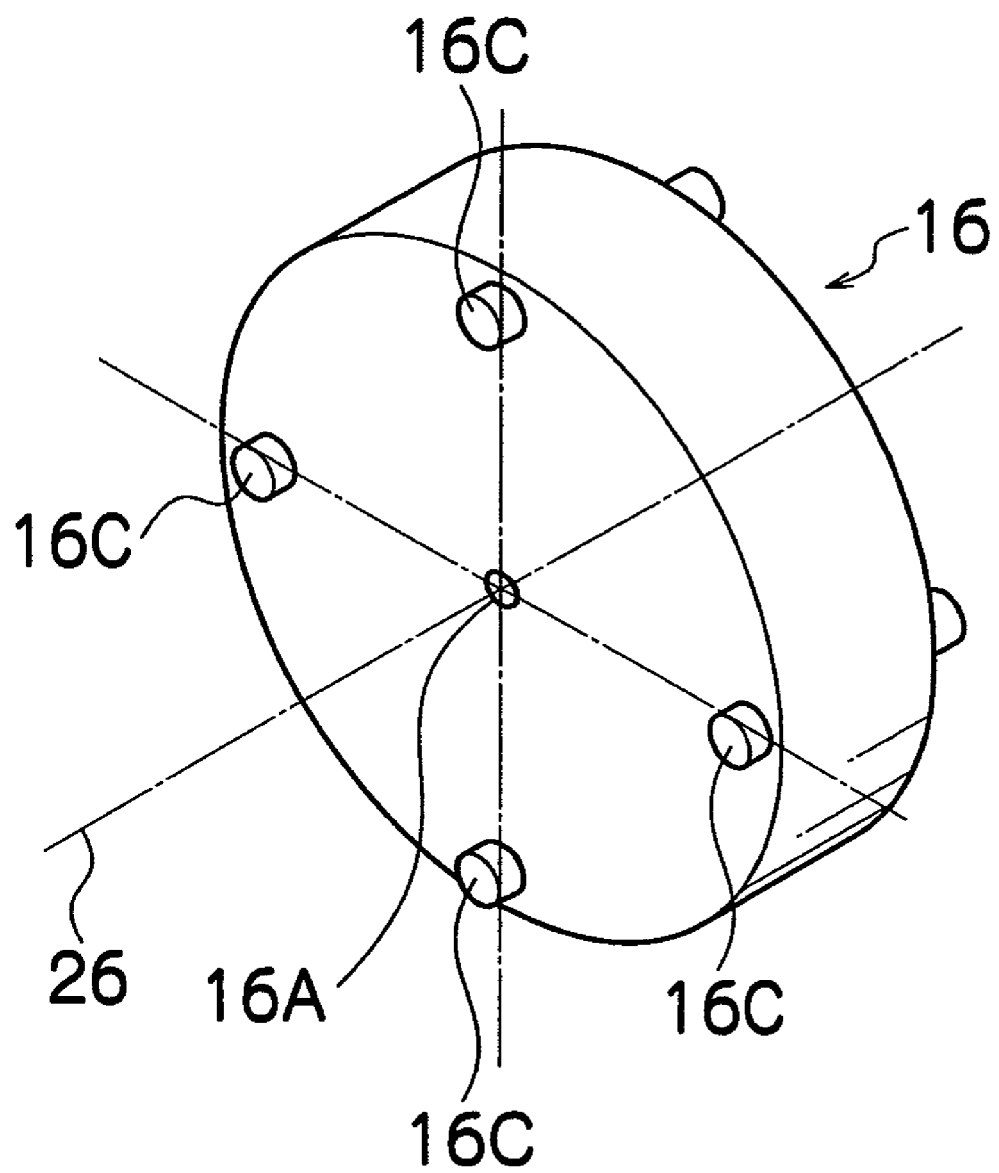
FIG. 5 is a perspective view illustrating another embodiment of positioning mechanism of the heat insulator.
Figure 6:
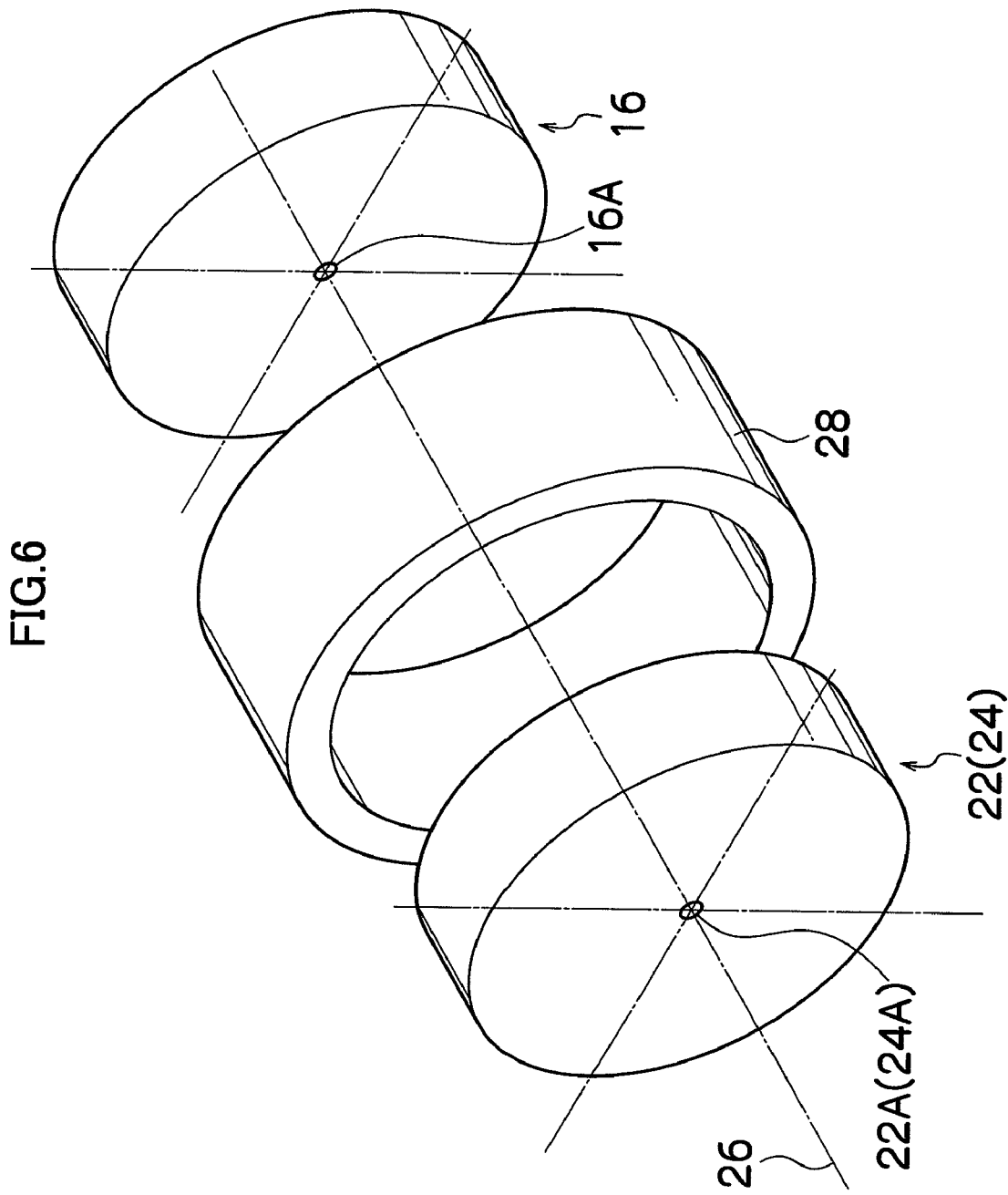
FIG. 6 is a perspective view illustrating further another embodiment of positioning mechanism of the heat insulator.

FIGS. 4 to 6 are schematic views of a positioning mechanism provided on the heat insulator 16.

The positioning mechanism illustrated in FIG. 4 is one in which circular projections 16B centered about the through hole 16A are formed on both faces of the heat insulator 16 formed in a disk shape. The circular projections 16B are fit into circular recesses 22B and 24B formed and centered about the communicating holes 22A and 24A on the temperature detectors 22 and 24. This causes the shaft center 26 of the through hole 16A of the heat insulator 16 to coincide with that of the communicating holes 22A and 24A of the temperature detectors 22 and 24 (refer to FIGS. 2 and 3).

The positioning mechanism illustrated in FIG. 5 is one in which a plurality of spike-type projections 16C is formed at equally spaced intervals at positions equal from the through hole 16A on both faces of the heat insulator 16 formed in a disk shape. The spike-type projections 16C are fit into a plurality of spike-type recesses (not shown) formed at equally spaced intervals at positions equal from the communicating holes 22A and 24A on the faces of the temperature detectors 22 and 24. The spike-type projections 16C positionally correspond to the spike-type recesses, causing the shaft center 26 of the through hole 16A of the heat insulator 16 to coincide with that of the communicating holes 22A and 24A of the temperature detectors 22 and 24.

The positioning mechanism illustrated in FIG. 6 is provided with a cylindrical sleeve 28 whose bore diameter is equal to the outer periphery of the heat insulator 16 and the temperature detectors 22 and 24 and the heat insulator 16 and the temperature detectors 22 and 24 are fit into the sleeve 28, thereby regulating the outer periphery of the heat insulator 16 and the temperature detectors 22 and 24. This causes the shaft center 26 of the through hole 16A of the heat insulator 16 to coincide with that of the communicating holes 22A and 24A of the temperature detectors 22 and 24.

The action of the micro fluid device 10 thus formed is described below.

The fluid A supplied to the inlet channel 12A of the fluid supplying unit 12 is heated by the heating medium X while flowing through the pipe 14D of the fine channel in the heating unit 14, thereby the temperature of the fluid A is accurately raised to a desired point. The temperature detector 22 measures whether the temperature of the fluid A is correctly raised to the desired point.

The fluid A the temperature of which is raised to the desired point flows into the pipe 18D of the cooling unit 18 through the through hole 16A of the heat insulator 16. The fluid A having flowed into the pipe 18D is quenched by the cooling medium Y in the cooling unit 18. The temperature detector 24 measures whether the fluid A is correctly cooled to the desired temperature.

Figure 7:
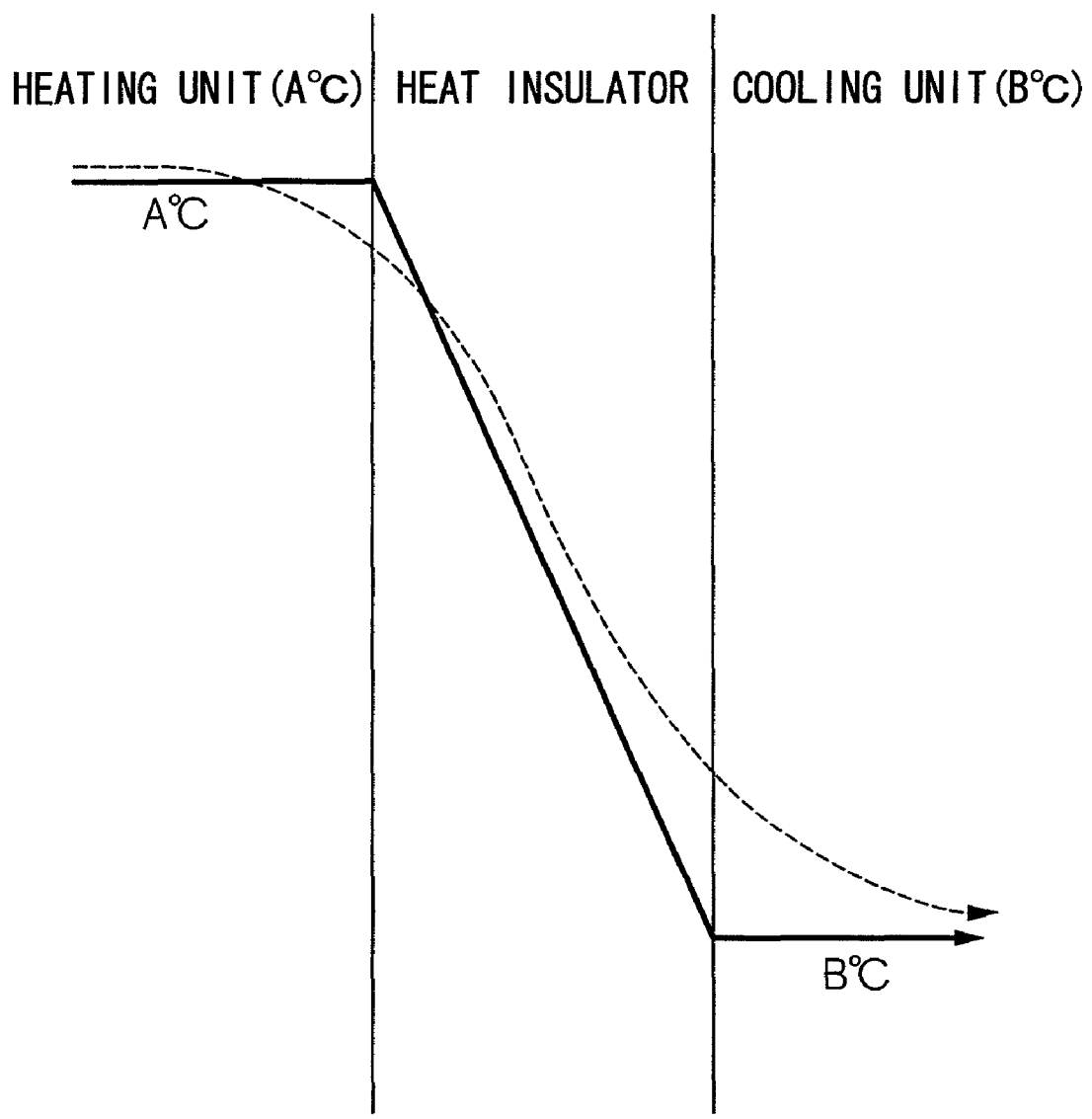
FIG. 7 is a chart describing the action and effect of the micro fluid device 10 according to the embodiments of the present invention.

The heating unit 14 and the cooling unit 18 are thermally insulated by the heat insulator 16 while the fluid A is quenched. The pipe 14D of the heating unit 14 is thermally separated from the pipe 18D of the cooling unit 18 by the through hole 16A of the heat insulator 16. As illustrated in FIG. 7, while passing through the through hole 16A of the heat insulator 16, the fluid A is quenched from a heating temperature of A° C. in the heating unit 14 to a cooling temperature of B° C. in the cooling unit 18 at a steep temperature gradient (as indicated by the solid line in FIG. 7). The temperature gradient indicated by the dotted line in FIG. 7 is obtained in the case where the pipe 14D of the heating unit 14 is coupled to the pipe 18D of the cooling unit 18 by a connector made of SUS material which has high heat conduction. This cannot provide a steep temperature gradient.

The fluid A of which the temperature is cooled to the desired point by the cooling unit 18 is discharged outside from the outlet channel 20A of the fluid discharging unit 20.

In the present embodiment, although the heating medium X and the cooling medium Y are flowed into the heating unit 14 and the cooling unit 18 respectively to control heat, an electric heater or a Peltier element may be used. In addition, in the present embodiment, each unit of the micro fluid device 10 is disk-shaped and cylindrical to obtain a thermal symmetry, a completely thermal symmetry is not always required to be maintained depending on kinds of fluid flowing through the pipe and a degree of demand for a temperature gradient. For instance, there may be used a rectangular parallelepiped unit.

Embodiment

The present embodiment is such that the micro fluid device 10 of the present invention illustrated in FIG. 1 is applied to a process for producing fine particle dispersion liquid (emulsion dispersion material) using a phase-inversion temperature emulsification reaction. In the phase-inversion temperature emulsification reaction, the fluid A is accurately heated to a predetermined temperature and then quenched to precipitate solute, thereby obtaining fine particle dispersion liquid.

As fluid supplied to the micro fluid device 10, the liquid A was used in which water is mixed with cyclohexane at a ratio of water of 54.6% by mass to cyclohexane of 36.4% by mass and then mixed with polyoxyethylene (POE) of 9% by mass. It is known that the liquid A develops a phase-inversion temperature emulsification phenomenon and the balance of hydrophilicity and lipophilic of POE inverts at a phase-inversion temperature of 60° C. to 65° C., and the liquid A becomes a system in which cyclohexane is dispersed in water at a temperature of 60° C. or less, however, the liquid A becomes a system in which water is dispersed in cyclohexane at a temperature of 65° C. or higher.

In the present embodiment, the diameter φ of the pipe 14D, the through hole 16A and the communicating holes 22A and 24A is set to 300 μm and the thickness of the heat insulator 16 is set to 15 mm. The diameter is not restricted if a heat exchange rate (thermal gradient) on the heat insulator 16 reaches a target. The diameter φ is preferably 5 mm or less at which the liquid A (fluid) generally flows as laminar flow, and is more preferably 1 mm or less.

The flow rate of the liquid A was set to 0.1 mL/min. The temperature of the heating medium X in the heating unit 14 was set to 85° C. and the temperature of the cooling medium Y in the cooling unit 18 was set to 5° C. Temperature was measured at the front and rear of the heat insulator 16 by the temperature detectors 22 and 24 (thermocouples were used) attached to the front and rear of the heat insulator 16.

According to the above micro fluid device 10, the liquid A which was heated to a phase-inversion temperature or higher by the heating unit 14 and was in a state where water is dispersed in cyclohexane was quenched at a cooling rate of 1000° C./sec or more while passing through the 15-mm thick heat insulator 16. This lowered the temperature of the liquid A to the phase-inversion point or less, and the liquid A becomes the system in which cyclohexane is finely dispersed in the water.

As a result, the diameters of fine particles in the liquid A varied from several μm to 100 μm before the fine particle passed through the micro fluid device 10 of the present invention. On the other hand, after the liquid A was caused to pass through the micro fluid device 10, a fine emulsified dispersion with good monodisperse in which the diameters of fine particles are 2 μm to 3 μm could be obtained.

What is claimed is:

1. A micro fluid device in which a plurality of units each having piping integrally coupled together to bring each piping of the units into communication with each other to cause fluid to flow into the piping to perform unit operations, and at least one of the plurality of units is a temperature controlling unit for controlling the temperature of the fluid, comprising:

a heating unit which heats the fluid and a cooling unit which cools the fluid, the heating unit and the cooling unit which are provided in the temperature controlling unit; and a heat insulator which has a through hole equal in diameter to the piping and is interposed between the heating unit and the cooling unit, wherein the heating unit and the cooling unit are thermally-insulated by the heat insulator, the piping of the heating unit and the piping of the cooling unit are thermally-insulated by the through hole formed in the heat insulator, and the heat insulator includes a positioning mechanism which positions the piping of the heating unit, the piping of the cooling unit and the through hole so as to communicate with each other.

2. The micro fluid device according to claim 1, wherein the piping of the heating unit and the piping of the cooling unit each has a diameter of 5 mm or less and the through hole has a diameter of 5 mm or less.

3. The micro fluid device according to claim 1, wherein the heat insulator has heat conduction coefficient $H_c$, where $0 < H_c \leqq 2$ (W/S/K) or less.

4. The micro fluid device according to claim 1, wherein the heat insulator has a thickness T, where 0.5 mm $\leqq$ T $\leqq$ 50 mm.

5. The micro fluid device according to claim 1, wherein the positioning mechanism performs positioning by fitting a projecting mating part provided on the heat insulator into a recessed mating part provided in the temperature controlling unit, and the projecting mating part is formed to be symmetrical with respect to the through hole.

6. The micro fluid device according to claim 5, wherein the each of the piping of the heating unit and the piping of the cooling unit has a diameter of 5 mm or less and the through hole has a diameter of 5 mm or less.

7. The micro fluid device according to claim 5, wherein the heat insulator has heat conduction coefficient $H_c$, where $0 < H_c \leqq 2$ (W/S/K) or less.

8. The micro fluid device according to claim 5, wherein the heat insulator has a thickness T, where 0.5 mm $\leqq$ T $\leqq$ 50 mm.

9. The micro fluid device according to claim 5, wherein the through hole of the heat insulator is subjected to surface treatment to improve durability under and affinity for the fluid.

10. The micro fluid device according to claim 5, wherein the heat insulator comprises a sealing member for preventing the fluid from leaking from a coupling portion between the piping of the heating unit and the through hole and between the piping of the cooling unit and the through hole.

11. The micro fluid device according to claim 5, further comprising a temperature detector with a temperature detecting function which is interposed between the temperature controlling unit and the heat insulator, and has a communicating hole for bring the piping of the heating unit and the piping of the cooling unit into communication with the through hole.

12. The micro fluid device according to claim 1, wherein the through hole of the heat insulator is subjected to surface treatment to improve durability under and affinity for the fluid.

13. The micro fluid device according to claim 1, wherein the heat insulator comprises a sealing member for preventing the fluid from leaking from a coupling portion between the piping of the heating unit and the through hole and the piping of the cooling unit and the through hole.

14. The micro fluid device according to claim 1, further comprising a temperature detector with a temperature detecting function which is interposed between the temperature controlling unit and the heat insulator, and has a communicating hole for bring the piping of the heating unit and the piping of the cooling unit into communication with the through hole.

15. The device of claim 1, wherein each of the heating and cooling unit respectively include only a single piping, and the piping of the heating unit and the piping of the cooling unit are thermally insulated from each other by the through hole formed in the heat insulator.

* * * * *